(12) United States Patent
Nobili et al.

(10) Patent No.: US 8,271,364 B2
(45) Date of Patent: Sep. 18, 2012

(54) METHOD AND APPARATUS FOR OBTAINING, ORGANIZING, AND ANALYZING MULTI-SOURCE DATA

(75) Inventors: William A. Nobili, Charlotte, NC (US); Michael S. Bonn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1378 days.

(21) Appl. No.: 11/160,117

(22) Filed: Jun. 9, 2005

(65) Prior Publication Data
US 2006/0282359 A1 Dec. 14, 2006

(51) Int. Cl.
*G06Q 40/00* (2006.01)
(52) U.S. Cl. ..... 705/35; 705/7.29; 705/14.1; 705/14.66; 705/26.7; 705/38; 707/790; 707/803
(58) Field of Classification Search .............. None
See application file for complete search history.

(56) References Cited

U.S. PATENT DOCUMENTS

| | | | | |
|---|---|---|---|---|
| 5,930,764 | A * | 7/1999 | Melchione et al. | 705/10 |
| 6,009,415 | A * | 12/1999 | Shurling et al. | 705/35 |
| 6,088,686 | A * | 7/2000 | Walker et al. | 705/38 |
| 6,513,018 | B1 * | 1/2003 | Culhane | 705/35 |
| 2002/0147669 | A1 * | 10/2002 | Taylor et al. | 705/35 |
| 2005/0044017 | A1 * | 2/2005 | Foss et al. | 705/30 |
| 2005/0055275 | A1 * | 3/2005 | Newman et al. | 705/14 |

OTHER PUBLICATIONS

Jordan, Arthur. "Database Marketing Builds on Relationships with Members," Credit Union News, (May 5, 1995), vol. 15, Iss. 9, p. 11.*
"Putting Customer Benefit First—to Provide Faster ROI—SAS Institute's Data Warehousing Practice Solves Business Problems" Business Wire, (May 19, 1998), p. 1.*
Snyder, Daniel. "From List Fatigue to Relationship Marketing; The Credit Card Industry Reassesses its Direct Mail Strategies," Credit World, (Nov./Dec. 1997), p. 27.*

* cited by examiner

*Primary Examiner* — Elizabeth Rosen
(74) *Attorney, Agent, or Firm* — Michael A. Springs; Moore & Van Allen PLLC; Patrick B. Horne

(57) ABSTRACT

The tool of the invention is a data gathering and analytical process that uses internal customer data and external CRA data to build a consumer credit market data base and data structure. The internal customer data is classified according to identified Customer Attributes, the CRA data is also classified according to identified Consumer Attributes and the combined data is further classified according to additional Value Added Attributes. The resulting data structure is organized at the individual level such that each individual has associated therewith values for each of the Customer Attributes, Consumer Attributes and Value Added Attributes. The resulting analysis can be used to set institutional strategies and/or to make predictive decisions on individual borrower credit requests.

17 Claims, 7 Drawing Sheets

CUSTOMER DATA FILE

| Customer Number | Nam | Address | SSN | Account 1 | Account 2 | Account 3 | Home Branch | ATM | On-line Banking |
|---|---|---|---|---|---|---|---|---|---|
| AAA | ------- | ------ | ------- | ------ | ------- | | -------- | ----- | -- |
| BBB | ------- | -------- | ------- | | ------- | ------- | -------- | ------- | |
| CCC | ------- | -------- | ------- | | ------ | | ------- | | --- |
| DDD | ------- | -------- | ------- | ------- | | | ------- | ------- | |
| EEE | ------- | -------- | ------- | | | ------- | ------- | ------- | -- |
| FFF | ------- | -------- | ------- | -------- | ------ | | ------- | ------- | |
| GGG | ------- | -------- | ------- | | ------- | | ------- | ------- | ---- |
| . . . | | | | | | | | | |
| NNN | ------ | -------- | ------- | ------ | ------ | ------- | ------- | ------- | -- |

FIG. 3

CUSTOMER RELATIONSHIP FILE

| Customer | Customer Attribute 1 | Customer Attribute 2 | Customer Attribute 3 | Customer Attribute 4 | Customer Attribute 5 | Customer Attribute 6 | Customer Attribute 7 | Customer Attribute ... | Customer Attribute n |
|---|---|---|---|---|---|---|---|---|---|
| AAA | X | | X | X | | X | | | X |
| BBB | | X | | X | X | | X | | |
| CCC | X | | X | | | | | | X |
| DDD | | | | | X | X | X | | |
| EEE | X | | X | X | | | | | X |
| FFF | | X | | X | | | X | | |
| GGG | X | X | X | X | X | X | X | | |
| . . . | | | | | | | | | |
| NNN | X | | X | | X | X | | | |

FIG. 4

CONSUMER SAMPLE FILE

| Consumer | Info. 1 | Info. 2 | Info. 3 | Info. 4 | Info. 5 | Info. 6 | Info. 7 | ... | Info. n |
|---|---|---|---|---|---|---|---|---|---|
| HHH | ------ |  | ------ | -------- |  | ----------- |  |  | -------- |
| III | ----- |  |  | ------- | ------- |  | --------- |  |  |
| JJJ |  | ------ | ------- |  | ------ | -------- | -------- |  | -------- |
| KKK |  |  |  | --------- | ------- | -------- | -------- |  |  |
| LLL |  | ------ | --------- |  | ------- | ------------ |  |  | --------- |
| MMM |  |  | -------- |  | --------- |  | ------- |  |  |
| NNN |  | ---------- | -------- | -------- | -------- |  | --------- |  | ---------- |
| . |  |  |  |  |  |  |  |  |  |
| ZZZ |  | --------- |  | --------- |  | -------- |  |  | -------- |

FIG. 5

Merged File

| Consumer/Customer Reference Number | Customer Attribute 1 | Customer Attribute 2 | Customer Attribute 3 | ... | Customer Attribute n | Info. 1 | Info. 2 | ... | Info. n |
|---|---|---|---|---|---|---|---|---|---|
| 001 | X |  | X |  | X | ----- |  |  | ----- |
| 002 |  | X |  |  |  | ------ |  |  |  |
| 003 | X |  | X |  | X |  | ------ |  | ----- |
| 004 |  |  |  |  |  |  |  |  |  |
| 005 | X |  | X |  | X |  | ----- |  | ----- |
| 006 |  | X |  |  |  |  |  |  |  |
| 007 | X | X | X |  |  |  | ------ |  | ------ |
| . |  |  |  |  |  |  |  |  |  |
| nnn | X |  | X |  |  |  | ------ |  | ----- |

FIG. 6

CUSTOMER/CONSUMER ATTRIBUTE FILE

| Consumer/ Customer Reference Number | Customer Attribute 1 | Customer Attribute 2 | Customer Attribute 3 | Customer Attribute 4 | Customer Attribute 5 | ... | Customer Attribute n | Consumer Attribute 1 | Consumer Attribute 2 | Consumer Attribute 3 | Consumer Attribute 4 | ... | Consumer Attribute n |
|---|---|---|---|---|---|---|---|---|---|---|---|---|---|
| 001 | x |   | x | x |   |   | x | x | x | x | x |   | x |
| 002 |   | x |   | x | x |   |   |   |   |   |   |   |   |
| 003 | x |   | x |   |   |   |   |   |   |   |   |   |   |
| 004 |   |   |   |   | x |   |   | x |   | x | x |   | x |
| 005 | x | x | x | x |   |   | x |   |   |   |   |   | x |
| 006 |   | x |   | x |   |   |   |   |   |   |   |   |   |
| 007 | x | x | x |   | x |   |   |   |   |   |   |   |   |
| . . . |   |   |   |   |   |   |   |   |   |   |   |   |   |
| nnn | x |   | x |   | x |   |   |   |   |   |   |   |   |

FIG. 7

USER FILE

| Customer/Consumer Ref. No. | Customer Attribute 1 | Customer Attribute 2 | Customer Attribute 3 | Customer Attribute ... | Customer Attribute n | Consumer Attribute 1 | Consumer Attribute 2 | Consumer Attribute 3 | Consumer Attribute ... | Consumer Attribute n | Value Added Attribute 1 | Value Added Attribute 2 | Value Added Attribute 3 | Value Added Attribute ... | Value Added Attribute n |
|---|---|---|---|---|---|---|---|---|---|---|---|---|---|---|---|
| 001 | x |   | x |   |   |   | x |   |   | x | x |   | x |   | x |
| 002 |   | x |   |   |   |   |   |   |   |   | x | x | x |   |   |
| 003 | x |   | x |   | x |   |   |   |   |   |   | x |   |   | x |
| 004 |   |   |   |   |   | x |   | x |   | x |   |   |   |   | x |
| 005 | x | x | x |   | x |   |   |   |   |   | x | x |   |   | x |
| 006 |   | x | x |   |   |   |   |   |   |   | x |   | x |   |   |
| 007 | x |   | x |   |   |   |   |   |   |   |   | x |   |   |   |
| ... |   |   |   |   |   |   |   |   |   |   |   |   |   |   |   |
| nnn | x |   | x |   |   |   |   |   |   |   |   | x |   |   | x |

FIG. 8

METHOD AND APPARATUS FOR OBTAINING, ORGANIZING, AND ANALYZING MULTI-SOURCE DATA

BACKGROUND

The invention relates generally to credit lending strategies and decision processes and more particularly to an improved method and apparatus for obtaining, organizing, and analyzing internal customer credit data and external consumer credit data.

Typically, banks and other lending institutions have access to different independent sources of consumer credit information. The first source of information are Consumer Reporting Agencies (CRA's) that gather and sell consumer credit information to lending institutions so that these lending institutions can make rational decisions as to the credit worthiness of a particular prospective borrower. Most lending institutions report the credit activity of their customers to a CRA such that the CRA can accumulate and maintain a data base of the borrowing/credit history for individual borrowers. The most common type of CRA is the credit bureau. The Fair Credit Reporting Act (FCRA), enforced by the Federal Trade Commission, is designed to promote accuracy and ensure the privacy of the information used in consumer reports. The information reported by the CRA's, called a consumer report, contains data that is maintained and reported as it relates to a particular individual consumer. Lending institutions use the information in the consumer reports to make a risk assessment regarding the extension of credit and/or the lending of money to an individual consumer.

Other data that a lending institution has access to is the institution's own customer information. For example, a lending institution such as a bank will have a wide variety of customer data on all of its banking customers such as the customer's type and size of accounts, borrowing and credit history, banking behavior patterns and the like. This data, while detailed, is limited to individuals that have an existing relationship with the institution.

The lending institutions also have access to publicly available data such as reports issued by the government. This data tends to be very high level and is accurate only at a very gross level. Moreover, because this data is available to everyone, it does not offer a competitive advantage to any one lending institution.

Thus, a tool for analyzing the consumer credit market that is accurate, scalable, predictive and specifically tailored to the needs of the institution is desired.

SUMMARY

The tool of the invention is a data gathering and analytical process that uses internal customer data and external CRA data to build a consumer credit market data base and data structure. The data base and data structure can be used to analyze the consumer credit market, reduce analysis time, and enable actionable prediction to support risk/reward strategies for consumer lending. The tool of the invention combines the consumer data maintained by the CRA's with the lending institution's internal customer data to create a data base and structure representative of the consumer credit market that has strategic planning value as well as predictive capabilities. The internal customer data is classified according to identified Customer Attributes, the CRA data is also classified according to identified Consumer Attributes and the combined data is further classified according to additional Value Added Attributes. The resulting data structure is organized at the individual level such that each individual has associated therewith values for each of the Customer Attributes, Consumer Attributes and Value Added Attributes. The data structure is searchable and the data is organized such that the institution in control of the data base can analyze the consumer lending market by any one or a combination of attributes. The resulting analysis can be used to set institutional strategies and/or to make predictive decisions on individual borrower credit requests.

BRIEF DESCRIPTION OF THE DRAWINGS

FIG. 3 shows the data structure for the Consumer Data file.

FIG. 4 shows the data structure for the Customer Relationship file.

FIG. 5 shows the data structure for the Consumer Sample file.

FIG. 6 shows the data structure for the Merged file.

FIG. 7 shows the data structure for the Customer/Consumer Attribute file.

FIG. 8 shows the data structure for the User file.

DETAILED DESCRIPTION

The present invention will now be described in terms of specific example embodiments. It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps.

As previously discussed, the invention relates to a data base and data structure and analytical tool that can be used to analyze the consumer credit market, reduce analysis time, and enable actionable prediction to support risk/reward strategies for consumer lending. It should be understood that terms like "bank," "financial institution," and "institution" are used herein in their broadest sense. Institutions, organizations, or even individuals that process loans or extend credit are widely varied in their organization and structure. Terms like bank and institution are intended to encompass all such possibilities, including but not limited to, finance companies, stock brokerages, credit unions, mortgage companies, manufacturers who grant loans to secure the purchase of goods, finance companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems or even a single work station if appropriate databases are present and can be accessed.

Figure 1:
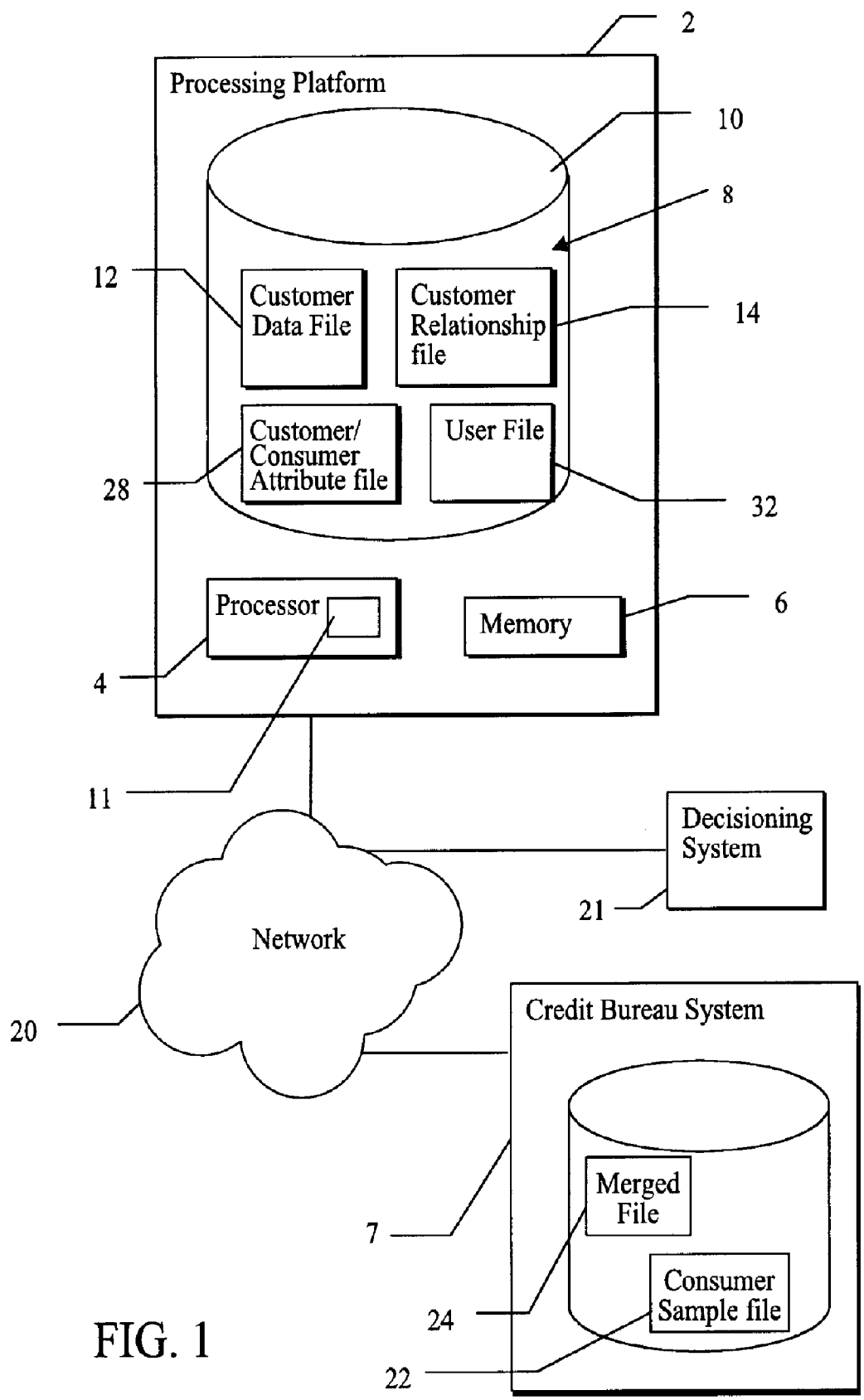
FIG. 1 is a block diagram showing one embodiment of the operating environment for the present invention.

FIG. 1 is a block diagram illustrating one example operating environment for the present invention. Processing platform 2 can include one or more processors 4 and a certain amount of memory 6. Such a processing platform has associated with it data storage 10 such as optical disks, magnetic tape or other storage device for storing the data files shown generally at 8, and computer programs or computer program code as shown at 11. Processing platform 2 may reside at the financial institution or with a contractor. In the example of FIG. 1, processing platform 2 and the affiliated storage and computer program code and data storage elements are used to aggregate and maintain historical data, transaction attribute information, credit bureau data, etc. This processing platform can also direct the updating and creation of User files or User file information as will hereinafter be described. In this example, processing platform 2 can communicate with credit bureau systems 7. Credit Bureau systems 7 are known in the art and reside at and are managed by the credit bureaus. The structure of the credit bureau systems 7 do not form part of the present invention except as described with respect to the creation and use of the Consumer Sample file 22 and the Merged file 24 as will hereinafter be described. Communication can take place over network 20, which may be via virtual private networking (VPN) or other encrypted connections over the Internet, or via private networking facilities. Decisioning systems 21 can access information from Processing Platform 2 as needed. These decisioning systems 21 may reside, for example, at financial institution branches, management offices, or technical and operation centers. Decisioning systems 21 may include customer service systems, loan application systems, collection systems and tracking systems.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media is conceptually illustrated at 11 of FIG. 1 as a fixed storage media, but it could also be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Computer program instructions which implement all or a portion of the invention may also be embodied in a stream of information being retrieved over a network such as the Internet. All of the computer program code involved in carrying out the processes described herein can reside with one party, or on a single system. This would be the case for example if a financial institution wished to have complete control of the process.

Figure 2:
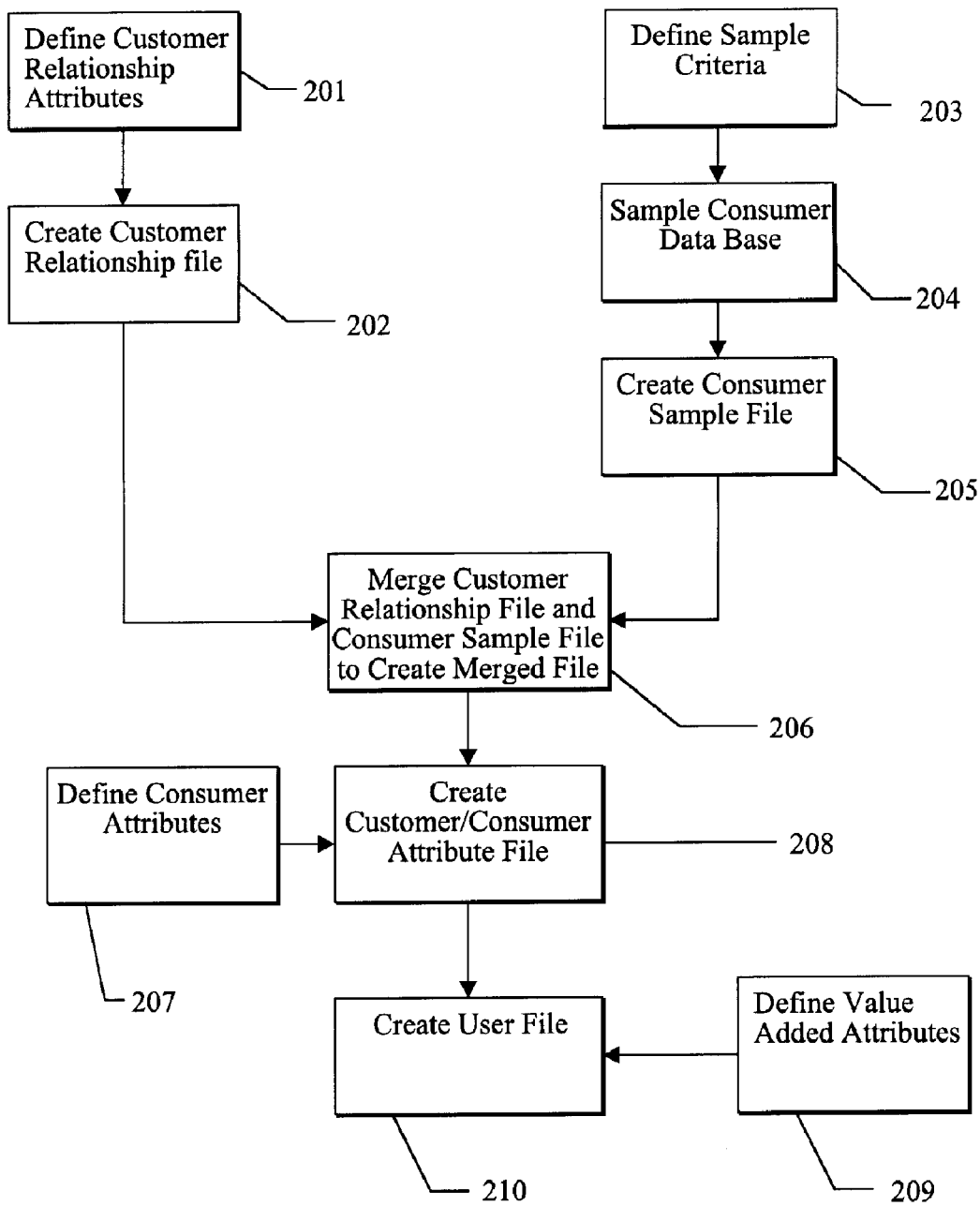
FIG. 2 is a flow chart showing one embodiment of the creation of the data structure of the present invention.

The process for developing the data base, data structure and analytical tool of the invention will be described with reference to FIGS. 1 and 2. The institution has an existing data store shown as data base 10 that includes a Customer Data file 12, maintained at the individual customer level. As best shown in FIG. 3 the Customer Data file 12 includes personal customer information 301 such as name, customer number, address, social security number and the like; account information 302 such as types and sizes of accounts, loan and debt activity and the like; and behavior information 303 such as on-line versus face-to-face interaction, branch usage and the like. The information described and shown in FIG. 3 is by way of example only and substantial other information may be maintained by the institution for its customers. This information is organized at the customer level such that for each of the institution's customers 304, the customer's personal, account and behavior activity is associated with that customer. It will be appreciated that the Customer Data file 12 may include information on millions of customers for a large institution. It is also contemplated that customer data file 12 may be maintained by a third party for the benefit of the institution.

From this customer information Customer Relationship Attributes are developed that define the relationship between the customer and the institution (block 201). A list of example Customer Relationship Attributes is set forth at the end of this Detailed Description. While a preferred set of Customer Relationship Attributes is exemplified herein, it is to be understood that a fewer or greater number of attributes may be used in the use of the system of the invention. The attributes actually used will depend on those attributes that are identified by the institution as being important to defining the relationship with the customer. It will further be understood that these attributes can change over time as the relationship between the institution and its customers changes over time.

Once these attributes have been identified a Customer Relationship file 14 is created (block 202). The Customer Relationship 14 file would typically be stored in a data store such as data base 10. It is to be understood that while the Customer Relationship file 14 is shown as being stored in data base 10 that also stores the institution's Customer Data file 12, separate data stores may be used. The Customer Relationship file 14 has a data structure, as best shown in FIG. 4, that is at the customer level such that for each institution customer 401, the customer is evaluated for the Customer Relationship Attributes 402 and a "value" is set for that attribute. The "value" could comprise a numerical value such as a ranking or dollar amount or it could comprise information such as zip code or it could be a binary flag such as Yes/No. Thus, for each customer of the institution 401 in the Customer Relationship file 14, the attributes 402 associated with that customer may be identified and captured. It is to be understood that not every customer of an institution need be included in the Customer Relationship file 14.

The institution also gathers information from the relevant CRA's. Specifically, the institution defines criteria and provides the criteria to one or more CRA's to define the consumers for which the institution desires consumer report data (block 203). The terms "customer" and "consumer" are used herein to distinguish between individuals that have a known relationship with the institution (customers) and individuals that may or may not have a relationship with the institution that are identified by a CRA as having a consumer credit relationship with another institution (consumers). The criteria may identify consumers based on specific criteria such as all consumers that have booked a particular institution product (e.g. credit card) during a desired time frame. Alternatively, the criteria may define a random sample of all consumers known to the CRA. A typical CRA data base 16 may have 280 million records on file. In order to manage the data, a sample of the total number of records may be used where, for example, the CRA samples every tenth record (block 204). A Consumer Sample file 22, shown in FIG. 5, is created by the CRA that is again at the individual consumer level where for each consumer 501 in the Consumer Sample file 22 all of the information 502 maintained by the CRA is associated with that consumer (block 205).

The Customer Relationship file 14 and the Consumer Sample file 22 are merged to create Merged file 24 (block 206). To merge the files a commercially available merging program using match logic such as PermID developed by TRANSUNION may be used. The resulting Merged file 24, shown in FIG. 6, will again be at the individual level where all of the attributes 402 captured in the Customer Relationship file 14 and all of the information 502 in the Consumer Sample file 22 are associated with an individual 601. In the merged file it will be appreciated that the individual may be a customer of the institution, a consumer or both (i.e. have an existing relationship with the institution and a consumer credit relationship with another institution). The Merged file 24 includes information maintained by the CRA for its consumers and all Consumer Attributes maintained and identified by the institution and captured in the Consumer Relationship file 14. Typically the Merged file 24 will be created by the CRA at the direction of the institution based on the criteria identified by the institution for selecting the consumers for the Consumer Sample file 22. The CRA, however, may send its consumer file to the institution where the institution will create the merged file or a third party may receive the Consumer Sample file from the CRA and the Consumer Relationship file from the Institution and create the merged file for the benefit of the institution.

In order to maintain the confidentiality of individual credit status the CRA may delete all information related to the identity of a particular consumer in the Merged file 24. Thus the Merged file 24 will identify the consumers/customers by reference number or other non-individual specific identifier. The information associated with that consumer/customer reference number will be specific to the individual but all identifying personal information such as name, social security number, address and the like will be removed from the Merged file 24.

Consumer Attributes are identified that define the relationship between the consumer and any institution with which the consumer has a relationship (block 207). A list of example Consumer Attributes is set forth at the end of this Detailed Description. While a preferred set of Consumer Attributes is exemplified herein, it is to be understood that a fewer or greater number of attributes may be used in the system of the invention. The Consumer Attributes actually used will depend on those relationships that are identified by the institution as being most important to defining the relationship between the consumer and the consumer credit market. It will further be understood that these attributes can change over time as the relationship between consumers and the consumer credit market changes over time.

Once these Consumer Attributes have been identified a Customer/Consumer Attribute file 28 is created (block 208). The Customer/Consumer Attribute file 28 would typically be stored in a data store such as data base 10. It is to be understood that while the Customer/Consumer Attribute file is shown as being stored in data base 10 that also stores the institutions other files, separate data stores may be used. Referring to FIG. 7, the Customer/Consumer Attribute file 28 has a data structure that is at the customer/consumer level such that for each individual customer and/or consumer 701, the individual is evaluated for each of the Consumer Attributes. The Customer/Consumer Attribute file 28 captures the data for each Customer Attribute 402 and for each Consumer Attribute 702 where a "value" is set for each attribute. The "value" may comprise a numerical value such as a ranking or dollar amount or it may comprise a piece of information such as zip code or it may be a binary flag such as Yes/No or the like.

Thus, for each customer/consumer in the Customer/Consumer Attribute file 28, the attributes associated with that customer and/or consumer are identified and captured. It is to be understood that some individuals will be consumers, some individuals will be customers and some individuals will be both consumers and customers. Consumers will only have Consumer Attributes 702 identified, customers will have only Customer Attributes 402 identified while consumer/customers have both Consumer Attributes and Customer Attributes identified. This file is at the individual level but does not include information that would allow the individuals to be identified as previously explained.

Value Added Attributes are defined (block 209) and a User File 32 is created (block 210) that includes the Value Added Attributes 802 in addition to the information contained in the Customer/Consumer Attribute file. The Value Added Attributes 802 consist primarily of comparative attributes and market total attributes. A list of example Value Added Attributes is set forth at the end of this Detailed Description. The comparative attributes are attributes that compare customer data and consumer data and market wide data. Market total attributes are attributes of the total consumer credit market. While a preferred set of Value Added Attributes 802 are exemplified herein, it is to be understood that a fewer or greater number of attributes may be used in the use of the system of the invention. The attributes actually used will depend on those relationships that are identified by the institution as being important to defining the relationship between the customer and consumer and the total consumer credit market. It will further be understood that these attributes can change over time as the relationship between customers and consumers and the consumer credit market changes over time.

The User file 32 would typically be stored in a data store such as data base 10. It is to be understood that while the User file 32 is shown as being stored in data base 10, a separate data store may be used. The User file 32 has a data structure, best shown in FIG. 8, maintained at the customer/consumer level such that for each individual customer and/or consumer 801, the individual is evaluated for each of the Value Added Attributes 802 and a "value" is set for that attribute. The "value" could comprise a numerical value such as a ranking or dollar amount or it could comprise a piece of information such as zip code or it could be a binary flag such as Yes/No.

Thus for each customer/consumer 801 in the User file 32, the Customer Attributes 402, Consumer Attributes 702 and Value Added Attributes 802 associated with that customer and/or consumer would be identified and captured. It is to be understood that some individuals will be consumers, some individuals will be customers and some individuals will be both consumers and customers. Consumers will have Consumer Attributes and Value Added Attributes identified, customers will have Customer Attributes and Value Added Attributes identified while consumer/customers will have all attributes identified. As previously explained this file is at the individual level but does not include information that would allow the individuals to be identified. It is to be understood that the status of an individual as a customer or consumer may change over time.

When creating the User file 32, in addition to identifying the Value Added Attributes, the data is scaled up from the sample provided by the CRA to a national level. The data is also scaled down in order to account for duplicative data. Duplicative data may result, for example, where one individual holds a joint account with another individual. Because the data is maintained and organized at the individual level this data would show up in the attributes associated with both joint account holders, in effect it would be captured twice. In order to scale up the data from the sample size to the actual market size, the sample could simply be multiplied by the sample rate, SR, (e.g. multiply the sample by 10 if one out of ten records is sampled) to estimate the size of the market; however, this will not account for duplicative data as described above.

The weighting methodology of the invention adjusts each line in the sample to combine the scaling up and scaling down in a single factor. To scale the data down a method for taking into account joint accounts has been developed. While most joint accounts are held by two people some accounts have more than two people. Therefore, the average number of holders per joint account is estimated at 2.1. The weighting of the data sample will be explained by way of example. Assume that an individual has three accounts and one of the accounts is a joint account and the other two accounts are individual accounts. To scale the data, the number of accounts held by the individual are totaled. In this example the total number of accounts (T) is 3. An ECOA (Equal Credit Opportunity Act) code that is unique to an account is used to identify joint account holders. Thus the system can identify which of the accounts are joint accounts. For each account a QT factor (number of holders per account) is assigned. For an independent account the QT factor is 1 and for the joint account the QT factor is 2.1. In the given example two of the accounts are individual and one of the accounts is joint. The QT factors for this individual are totaled (1+1+2.1=4.1) such that the customer's QT value is 4.1. The QT value (4.1) is scaled down by dividing it by the total number of accounts, T, (in this example T=3), such that the scale down factor is 4.1/3. To scale up this individual's accounts to determine the portion of the total market this account represents, the individual's total number of accounts (T=3) is multiplied by 10 (the sample rate, SR) and then divided by the scale down factor (4.1/3) or:

$$(T \times SR)/(QT/T) = (3 \times 10)/(4.1/3) = 21.95.$$

Thus, this single individual represents 21.95 accounts of the total market. The individual values of this individual's attributes can be multiplied by 21.95 to determine the partial market represented by this individual. The total market can be determined by adding the partial market values of all of the individuals in the sample. Account balances are treated the same way.

Once the User file 32 is created it can be used for in depth market analysis and/or for its predictive value. For market analysis the data can be analyzed to show specific consumer behavior or institution versus market performance or consumer versus institution versus market behavior. In one example market analysis, the institution may compare the activity of individuals, both customers and consumers, for a particular product offering in order to identify the attributes of individuals that were booked with the institution compared to the attributes of individuals that were not booked with the institution.

Figure 9:
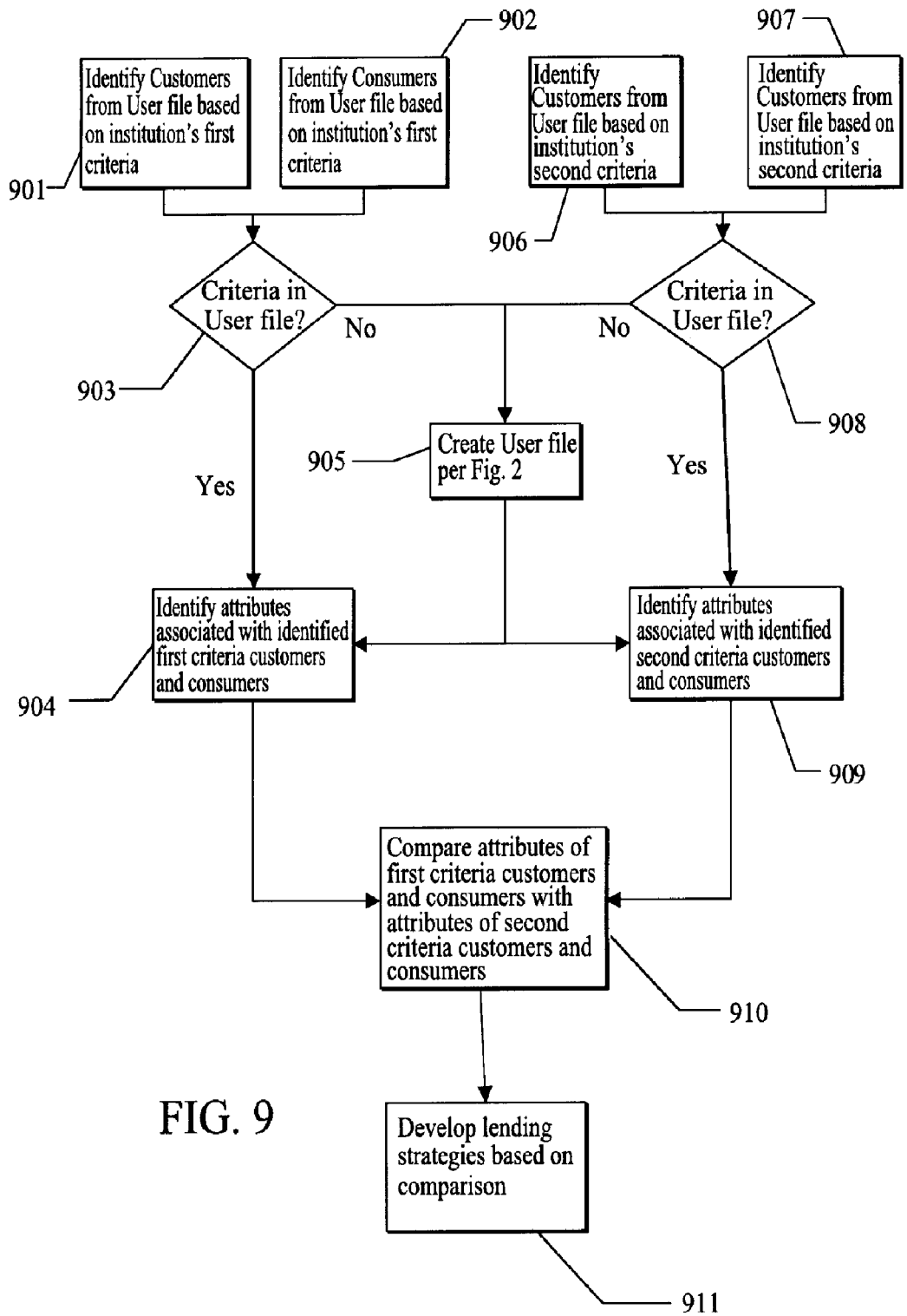
FIG. 9 is a flow chart showing an example analysis using the system and User file of the invention.

This analysis will be further explained by way of example with reference to FIG. 9. All customers that applied to the institution for a particular product offering are identified from the Customer Attributes in User file 32 based on specific criteria (block 901). Assume for purposes of this example that the product offering under review is auto loans. The criteria could further limit the customers by targeting a specific time frame such as first quarter year 1. All consumers that opened an auto loan during the same time period with another institution are also identified from the Consumer Attributes in User file 32 (block 902). If this information is identifiable from the attributes in an existing User file (block 903), both sets of individuals can be identified and all attributes related to the two sets can be identified (block 904). If for some reason the individuals cannot be identified from the existing User file (for example, the User file information was not gathered for the desired time frame) an analysis specific User file can be created following the procedure outlined with reference to FIG. 2 (block 905). In this instance the Customer Relationship file 14 is created from the Customer data file 12 for only those individuals that meet the analysis criteria (e.g. customers that applied for an auto loan during the target time period). Likewise the Consumer Sample File 22 is created from a sample of those consumers that opened an auto loan with another institution during the target time period. These files are merged and the User file is created as previously described except that this User file captures only those individuals that meet the desired criteria. This User file allows access to all attributes for the targeted individuals such that attributes of auto loan customers can be compared to the attributes of auto loan consumers generally. The two sets of data allow the institution to view any variation of the auto loan market including individuals that:

Applied to and booked with the institution;
Applied to and were approved by the institution but booked elsewhere;
Applied to but were declined by the institution and booked elsewhere;
Applied elsewhere and were booked elsewhere; and
Applied to the institution but did not book anywhere.

Prior to the implementation of the analytical tool of the invention, the institution would only have a complete view of individuals that applied to and booked with the institution and a partial view of individuals that applied to the institution but did not book with the institution.

A further analytical approach would be to repeat the forgoing process for the same product at a later date. For example, customers that applied to the institution for the same product offering are identified (block 906). The criteria are modified from the initial analysis in that the specific time frame is redefined as first quarter year 3. All consumers that opened an auto loan during the same time period with another institution are also identified from the Consumer Attributes in User file 32 (block 907). If this information is identifiable from the attributes in an existing User file (block 908), both sets of individuals can be identified and all attributes related to the two sets can be identified (block 909). If for some reason the individuals cannot be identified from the existing User file an analysis specific User file can be created following the procedure outlined with reference to FIG. 2 (block 905). The second User file in addition to capturing loan applications and booking information may also include loan performance criteria including delinquencies, charge offs, repossessions and the like reported by the CRA. By comparing the two User files (block 910) the institution can identify which loan applicants were credit worthy and which were not and the attributes of each group of loan applicants. The institution can compare actual loan performance with predicted credit worthiness to determine if the institution's loan scoring criteria was actually predictive of performance. The institution can also plan future strategies to focus on the more credit worthy applicants (block 911). Any other attribute of the groups can also be compared and contrasted such that performance over time can be tracked. Other market analysis can also be performed using the data base as shown and described.

In one such strategy the User data base can be used for its predictive value. To make the decision for loaning money or extending credit to a potential borrower is typically made based on a credit score that represents the credit trustworthiness of the applicant. The credit score is compared to a cutoff score that is developed based on the pass rates and bad rates for the particular type of loan the applicant seeks and the decision to make the loan is based on this comparison. The CRA may compute and provide the applicant's score to the lending institution or the CRA may provide the raw data to the lending institution and the lending institution will compute its own score. The lending institution may take into account information the lending institution has determined has a bearing on its decision to lend money from the foregoing analysis. For example, the lending institution may be more likely to make a loan to a customer that holds a certain type of account and/or dollar amount with the institution, or that has other attributes that are identified as being indicators of the credit worthiness of an individual borrower.

Customer Relationship Attributes
ID
SSN
First name
Middle name
Last name
Suffix
Address line 1
Address line 2
City
State
Zip first 5 digits code
Zip 4
On us flag
Type of tax identification code
INST ("Institute") first mortgage number of open accounts
INST first mortgage sum of balances for open accounts
INST first mortgage sum of originations for open accounts
Months on book for oldest open first mortgage account
Months on book for youngest open first mortgage account
INST home equity loan number of open accounts
INST home equity loan sum of balances for open accounts
INST home equity loan sum of originations for open accounts
Months on book for oldest open home equity loan account
Months on book for youngest open home equity loan account
INST auto number of open accounts
INST auto sum of balances for open accounts
INST sum of originations for open accounts
Months on book for oldest open auto account
Months on book for youngest open auto account
INST other installment number of open accounts
INST other installment sum of balances for open accounts
INST other installment sum of originations for open accounts
Months on book for oldest open other installment account
Months on book for youngest open other installment account
INST heloc number of open accounts
INST heloc sum of balances for open accounts
INST heloc sum of originations for open accounts
Months on book for oldest open heloc account
Months on book for youngest open heloc account
INST bankcard number of open accounts
INST bankcard sum of balances for open accounts
INST bankcard sum of originations for open accounts
Months on book for oldest open bankcard account
Months on book for youngest open bankcard account
INST other loc number of open accounts
INST other loc sum of balances for open accounts
INST other loc sum of originations for open accounts
Months on book for oldest open other loc account
Months on book for youngest open other loc account
INST any deposit number of open accounts
INST any deposit sum of balances for open accounts
Months on book for oldest open deposit account
Months on book for youngest open deposit account
INST any investment number of open accounts
INST any investment sum of balances for open accounts
Months on book for oldest open investment account
Months on book for youngest open investment account
Bureau refresh score
INST dfs auto number of open accounts
INST dfs auto sum of balances for open accounts
INST dfs speciality number of open accounts
INST dfs speciality sum of balances for open accounts
INST heloc number of increase accounts in last 3 month
INST heloc sum of balances for increase accounts in last 3 months
INST heloc sum of line amount for increase accounts in last 3 months
INST heloc sum of incremental line amount for increase accounts in last 3 months
INST secured bankcard number of open accounts
INST secured bankcard sum of balances for open accounts
INST secured bankcard sum of line amount for open accounts
INST checking number of open accounts
INST checking sum of balances for open accounts
INST cd number of open accounts
INST cd sum of balances for open accounts
INST ira number of open accounts
INST ira sum of balances for open accounts
INST money market number of open accounts
INST money market sum of balances for open accounts
INST regular savings number of open accounts
INST regular savings sum of balances for open accounts
INST annuity number of open accounts
INST annuity sum of balances for open accounts
INST brokerage number of open accounts
INST brokerage sum of balances for open accounts
INST money manager number of open accounts
INST money manager sum of balances for open accounts
INST number of atm/check cards
INST first mortgage nibt amount for open accounts
INST home equity loan nibt amount for open accounts
INST auto nibt amount for open accounts
INST other installment nibt amount for open accounts
INST heloc nibt amount for open accounts
INST bankcard nibt amount for open accounts
INST other loc nibt amount for open accounts
INST any deposit nibt amount for open accounts
INST any investment nibt amount for open accounts
Insufficient funds fees amount
Overdraft charge amount
Fully allocated net income amount
Net interest income amount
Non interest income amount
Non interest expense amount
# of months party has had a bofa relationship
Name form code
Service level indicator code Sales and service sales channel code
Plus code
Number of premier sales channel accounts
Number of private bank sales channel accounts
Number of small business sales channel accounts
Associate indicator
Customer age
Gender
Seg_cd when seg_typ_cd=pprf
Seg_cd when seg_typ_cd=nedatt
Seg_cd when seg_typ_cd=ciggrp
Seg_cd when seg_typ_cd=potndep
Seg_cd when seg_typ_cd=potnin
Seg_cd when seg_typ_cd=potninv
Seg_cd when seg_typ_cd=potntotbl
Seg_cd when seg_typ_cd=valuquad
Realized profit amount
Realized profit deposit amount
Realized profit investment amount
Realized profit loan amount
Unrealized total balance amount
Unrealized deposit amount
Unrealized investment amount
Unrealized loan amount
Unrealized profit amount
Unrealized profit deposit amount
Unrealized profit investment amount
Unrealized profit loan amount
Ethnicity code
Ethnicity code
Market segment code
Party collection child indicator
Party collection demographic cluster code
Party collection demographic cluster group code
Home purchase amount
Home market value amount
Available home equity amount
Loan to value percent
Home owner indicator
Home owner rent code
Number of service calls to the vru system
Number of times logged in to online banking/billpay
Premier migration quarters on book
Loan purpose
Loan channel
Application date
Amount requested
Score
Custom score
Actual ltv
Actual dti
Final application status
Interest rate
Days to fund
Line increase flag
Allowable ltv
Allowable dti
INST lien position
Total lien amount
Prequel flag
Application date
Amount requested
Score
Custom score
Actual ltv
Actual dti
Final application status
Interest rate
Days to fund
Number of applications
Escrow deposit at closing
Property zipcode
On us refinance transaction indicator
Property sales price
Total ltv
Incomplete application decline
Asset related decline
Bankruptcy related decline
Credit report delinquency decline
Employment related decline
Income related decline
Insufficient credit reference decline
Other decline
Derogatory public record decline
Property related decline
Score decline
Credit card channel
Mtg product
Home equity product
CCA cobrand count
CCA cobrand balance
CCA aggregate count
CCA aggregate balance
Total teller deposit count
Total teller withdrawal count
Total ATM withdrawal count
Total ATM deposit count
Max teller deposit count
Max teller withdrawal count
Max vru inquery count
Max online banking logon count
Max ATM withdrawal count
Max ATM deposit count
Heloc channel
Fleet match
Heloc increase flag
Heloc increase months on book
Heloc increase line
Consumer Attributes
TU zip code
TU city
TU state
Job specific sequence # created by TU (7Z070100000001-7Z073999999999)
INST first lien number of open accounts
INST first lien number of open accounts opened w/in the last 3 m
INST first lien sum of bal for open accounts
INST first lien sum of bal for open accounts opened w/in 3 m
INST first lien number of accounts currently 90+ verified w/in the last 6 m
INST first lien sum of bal currently 90+ verified w/in the last 6 m
INST first lien sum of amount financed for open accounts
INST first lien sum of amount financed for open accounts w/in 3 m
INST lien age of oldest trade
Non-INST non-finance first lien number of open accounts
Non-INST non-finance first lien number of open accounts opened w/in the last 3 m
Non-INST non-finance first lien sum of bal for open accounts Non-INST non-finance first lien sum of bal for open accounts w/in 3 m Non-INST non-finance first lien number of accounts currently 90+ verified w/in 6 m Non-INST non-finance first lien sum of bal currently 90+ verified w/in 6 m Non-INST non-finance first lien sum of amount financed for open accounts Non-INST non-finance first lien sum of amount financed for open accounts open w/in 3 m Non-INST non-finance first lien age of oldest trade Non-INST finance first lien number of open accounts Non-INST finance first lien number of open accounts opened w/in the last 3 m Non-INST finance first lien sum of bal for open accounts Non-INST finance first lien sum of bal for open accounts w/in 3 m Non-INST finance first lien number of accounts currently 90+ verified w/in 6 m Non-INST finance first lien sum of bal currently 90+ verified w/in 6 m Non-INST finance first lien sum of amount financed for open accounts Non-INST finance first lien sum of amount financed for open accounts open w/in 3 m Non-INST finance first lien age of oldest trade INST home equity loan number of open accounts INST home equity loan number of open accounts opened w/in the last 3 m INST home equity loan sum of bal for open INST home equity loan sum of bal for open accounts opened w/in 3 m INST home equity loan number of accounts currently 90+ verified w/in the last 6 m INST home equity loan sum of bal currently 90+ verified w/in the last 6 m INST home equity loan sum of amount financed for open accounts INST home equity loan sum of amount financed for open accounts open with 3 m Non-INST non-finance home equity loan number of open accounts Non-INST non-finance home equity loan number of open accounts opened w/in the last 3 m Non-INST non-finance home equity loan sum of bal for open accounts Non-INST non-finance home equity loan sum of bal for open accounts w/in 3 m Non-INST non-finance home equity loan number of accounts currently 90+ verified w/in 6 m Non-INST non-finance home equity loan sum of bal currently 90+ verified w/in 6 m Non-INST non-finance home equity loan sum of amount financed for open accounts Non-INST non-finance home equity loan sum of amount financed for open accounts open w/in 3 m Non-INST finance home equity loan number of open accounts Non-INST finance home equity loan number of open accounts opened w/in the last 3 m Non-INST finance home equity loan sum of bal for open accounts Non-INST finance home equity loan sum of bal for open accounts w/in 3 m Non-INST finance home equity loan number of accounts currently 90+ verified w/in 6 m Non-INST finance home equity loan sum of bal currently 90+ verified w/in 6 m Non-INST finance home equity loan sum of amount financed for open accounts Non-INST finance home equity loan sum of amount financed for open accounts open with 3 m INST auto number of open accounts INST auto number of open accounts opened w/in the last 3 m INST auto sum of bal for open accounts INST auto sum of bal for open accounts opened w/in 3 m INST auto number of accounts currently 90+ verified w/in the last 6 m INST auto sum of bal currently 90+ verified w/in the last 6 m INST auto sum of amount financed for open accounts INST auto sum of amount financed for open accounts open with 3 m Non-INST non-finance auto number of open accounts Non-INST non-finance auto number of open accounts opened w/in the last 3 m Non-INST non-finance auto sum of bal for open accounts Non-INST non-finance auto sum of bal for open accounts w/in 3 m Non-INST non-finance auto number of Non-INST non-finance auto sum of bal currently 90+ verified w/in 6 m Non-INST non-finance auto sum of amount financed for open accounts Non-INST non-finance auto sum of amount financed for open accounts open with 3 m Non-INST finance auto number of open accounts Non-INST finance auto number of open accounts opened w/in the last 3 m Non-INST finance auto sum of Non-INST finance auto sum of bal for open accounts w/in 3 m Non-INST finance auto number of accounts currently 90+ verified w/in 6 m Non-INST finance auto sum of bal currently 90+ verified w/in 6 m Non-INST finance auto sum of amount financed for open accounts Non-INST finance auto sum of amount financed for open accounts open with 3

INST other installment number of open accounts

INST other installment number of open accounts opened w/in the last 3 m

INST other installment sum of bal for open accounts

INST other installment sum of bal for open accounts opened w/in 3 m

INST other installment number of accounts currently 90+ verified w/in the last 6 m INST other installment sum of bal currently 90+ verified w/in the last 6 m INST other installment sum of amount financed for open accounts INST other installment sum of amount financed for open accounts open with 3 m Non-INST non-finance other installment number of open accounts Non-INST non-finance other installment of open accounts opened w/in the last 3 m Non-INST non-finance other installment sum of bal for open accounts Non-INST non-finance other installment sum of bal for open accounts w/in 3 m Non-INST non-finance other installment number of accounts currently 90+ verified w/in 6 m
Non-INST non-finance other installment sum of bal currently 90+ verified w/in 6 m
Non-INST non-finance other installment sum of amount financed for open accounts
Non-INST non-finance other installment sum of amount financed for open accounts open w/in 3 m
Non-INST finance other installment number of open accounts
Non-INST finance other installment number of open accounts opened w/in the last 3 m
Non-INST finance other installment sum of bal for open accounts
Non-INST finance other installment sum of bal for open accounts w/in 3 m
Non-INST finance other installment number of accounts currently 90+ verified w/in 6 month
Non-INST finance other installment sum of bal currently 90+ verified w/in 6 m
Non-INST finance other installment sum of amount financed for open accounts
Non-INST finance other installment sum of amount financed for open accounts open with 3 m
INST heloc number of open accounts
INST heloc number of open accounts in last 3 month
INST heloc sum of bal for open accounts
INST heloc sum of bal for open accounts opened w/in 3 m
INST heloc number of accounts currently 90+ verified w/in the last 6 m
INST heloc sum of bal currently 90+ verified w/in the last 6 m
INST heloc sum of credit limit for open accounts
INST heloc sum of credit limit for open accounts open w/in 3 m
INST heloc number of open accounts with a zero bal
INST heloc number of open accounts opened w/in the last 3 m
Non-INST non-finance heloc number of open accounts
Non-INST non-finance heloc number of open accounts opened w/in the last 3 m
Non-INST non-finance heloc sum of bal for open accounts
Non-INST non-finance heloc sum of bal for open accounts w/in 3 m
Non-INST non-finance heloc number of accounts currently 90+ verified w/in 6 m
Non-INST non-finance heloc sum of bal currently 90+ verified w/in 6 m
Non-INST non-finance heloc sum of credit limit for open accounts
Non-INST non-finance heloc sum of credit limit for open accounts open w/in 3 m
Non-INST non-finance heloc number of open accounts with a zero bal
Non-INST non-finance heloc number of open accounts opened w/in the last 3 m with a zero bal
Non-INST finance heloc number of open accounts
Non-INST finance heloc number of open accounts opened w/in the last 3 m
Non-INST finance heloc sum of bal for open accounts
Non-INST finance heloc sum of bal for open accounts w/in 3 m
Non-INST finance heloc number of accounts currently 90+ verified w/in 6 m
Non-INST finance heloc sum of bal currently 90+ verified w/in 6 m
Non-INST finance heloc sum of credit limit for open accounts
Non-INST finance heloc sum of credit limit for open accounts open w/in 3 m
Non-INST finance heloc number of open accounts with a zero bal
Non-INST finance heloc number of open accounts opened w/in the last 3 m with a zero bal
INST bankcard number of open accounts
INST bankcard number of open accounts opened w/in the last 3 m
INST bankcard sum of bal for open accounts
INST bankcard sum of bal for open accounts opened w/in 3 m
INST bankcard number of accounts currently 90+ verified w/in the last 6 m
INST bankcard sum of bal currently 90+ verified w/in the last 6 m
INST bankcard sum of credit limit for open accounts
INST bankcard sum of credit limit for open accounts open with 3 m
INST bankcard number of open accounts with a zero bal
INST bankcard number of open accounts opened w/in the last 3 m with a zero bal
INST bankcard age of oldest trade
INST bankcard age of youngest trade
INST bankcard highest open bal
INST bankcard credit limit for highest open bal
Non-INST non-finance bankcard number of open accounts
Non-INST non-finance bankcard number of open accounts opened w/in the last 3 m
Non-INST non-finance bankcard sum of bal for open accounts
Non-INST non-finance bankcard sum of bal for open accounts w/in 3 m
Non-INST non-finance bankcard number of accounts currently 90+ verified w/in 6 m
Non-INST non-finance bankcard sum of
Non-INST non-finance bankcard sum of credit limit for open accounts
Non-INST non-finance bankcard sum of credit limit for open accounts open w/in 3 m
Non-INST non-finance bankcard number of open accounts with a zero bal
Non-INST non-finance bankcard number of open accounts opened w/in the last 3 m with a zero bal
Non-INST non-finance bankcard age of oldest trade
Non-INST non-finance bankcard age of youngest trade
Non-INST non-finance bankcard highest bal
Non-INST non-finance bankcard credit limit for highest open bal
Non-INST finance bankcard number of open accounts
Non-INST finance bankcard number of open accounts opened w/in the last 3 m
Non-INST finance bankcard sum of bal for open accounts
Non-INST finance bankcard sum of bal for open accounts w/in 3 m
Non-INST finance bankcard number of accounts currently 90+ verified w/in 6 m
Non-INST finance bankcard sum of bal currently 90+ verified w/in 6 m
Non-INST finance bankcard sum of credit limit for open accounts
Non-INST finance bankcard sum of credit limit for open accounts open w/in 3 m
Non-INST finance bankcard number of open accounts with a zero bal Non-INST finance bankcard number of open accounts opened w/in the last 3 m with a zero bal
Non-INST finance bankcard age of oldest trade
Non-INST finance bankcard age of youngest trade
Non-INST finance bankcard highest open bal
Non-INST finance bankcard credit limit for highest open bal
INST other loc number of open accounts
INST other loc number of open accounts opened w/in the last 3 m
INST other loc sum of bal for open accounts
INST other loc sum of bal for open accounts opened w/in 3 m
INST other loc number of accounts currently 90+ verified w/in the last 6 m
INST other loc sum of bal currently 90+ verified w/in the last 6 m
INST other loc sum of credit limit for open accounts
INST other loc sum of credit limit for open accounts open with 3 m
INST other loc number of open accounts with a zero bal
INST other loc number of open accounts opened w/in the last 3 m with a zero bal
Non-INST non-finance other loc number of open accounts
Non-INST non-finance other loc number of open accounts opened w/in the last 3 m
Non-INST non-finance other loc sum of bal for open accounts
Non-INST non-finance other loc sum of bal for open accounts w/in 3 m
Non-INST non-finance other loc number of accounts currently 90+ verified w/in 6 m
Non-INST non-finance other loc sum of bal currently 90+ verified w/in 6 m
Non-INST non-finance other loc sum of credit limit for open accounts
Non-INST non-finance other loc sum of credit limit for open accounts open with 3 m
Non-INST non-finance other loc number of open accounts with a zero bal
Non-INST non-finance other loc number of open accounts opened w/in the last 3 m with a zero bal
Non-INST finance other loc number of open accounts
Non-INST finance other loc number of open accounts opened w/in the last 3 m
Non-INST finance other loc sum of bal for open accounts
Non-INST finance other loc sum of bal for open accounts w/in 3 m
Non-INST finance other loc number of accounts currently 90+ verified w/in 6 m
Non-INST finance other loc sum of bal currently 90+ verified w/in 6 m
Non-INST finance other loc sum of credit limit for open accounts
Non-INST finance other loc sum of credit limit for open accounts open with 3 m
Non-INST finance other loc number of open accounts with a zero bal
Non-INST finance other loc number of open accounts opened w/in the last 3 m with a zero bal
Thin file flag
Bankruptcy within 24 m flag
Consumer credit counseling w/in 24 m flag
Number of trades with a repossession w/in 24 m
Number of trades with a chargeoff w/in 24 m
Number of trades with a foreclosure w/in 24 m
Sum of collection bal
Number of months on the file
Number of non-INST inquiries with kob of B w/in 3 m
Number of non-INST inquiries with kob of F or Q w/in 3 m
Number of non-INST inquiries with kob of A w/in 3 m
Number of non-INST inquiries with kob other than A, B, F, or Q w/in 3 m
Number of INST inquiries w/in 3 m
inquiries 0-5 months excluding last 7 days
revolving trade lines with bal
Average months in file
Net fraction installment burden
Net fraction revolving burden
% trade lines never delinquent
Months since most recent delinquency
% installment trade lines
Maximum delinquency ever
bank/nat'l trades with bal 75% of high credit
retail trade lines with bal
trade lines 60+ ever and derog public records
trade lines 90+ ever and derog public records
revolving/open TL with bal opened in last 12 m
Max delq/public records in last 12 m
satisfactory ratings
Worst credit bureau rating
% trade line with bal
Worst rating installment trade lines
Worst rating revolving/open trade lines
Months since most recent inquiry
installment trade line 30+ ever
Months since most recent 60+ delinquency
Months since most recent derogatory rating
Months since oldest revolving/open trade line opened
trade lines now current
non-il trade lines with bal 50% of high credit
revolving/open trade lines with bal
trade lines opened in last 12 m
Average revolving/open bal
Months since oldest date opened
Total amount now past due
inquiries 0-5 months
major derogatory ratings
Months since most recent finance trade line opened
Worst credit bureau rating details
Worst rating trade lines reported in last 24 m
INST first lien current bal for open accounts with the highest bal
INST first lien amount financed for open accounts with the highest bal
INST first lien open date for open accounts with the highest bal
INST first lien monthly payment for open accounts with the highest bal
INST first lien loan amortization term for open accounts with the highest bal
INST first lien current bal for open accounts with the $2^{nd}$ highest bal
INST first lien amount financed for open accounts with the $2^{nd}$ highest bal
INST first lien open date for open accounts with the $2^{nd}$ highest bal
INST first lien monthly payment for open accounts with the $2^{nd}$ highest bal
INST first lien loan amortization term for open accounts with the $2^{nd}$ highest bal
INST first lien current bal for open accounts with the $3^{rd}$ highest bal INST first lien amount financed for open accounts with the $3^{rd}$ highest bal
INST first lien open date for open accounts with the $3^{rd}$ highest bal
INST first lien monthly payment for open accounts with the $3^{rd}$ highest bal
INST first lien loan amortization term for open accounts with the $3^{rd}$ highest bal
Non-INST first lien current bal for open accounts with the highest bal
Non-INST first lien amount financed for open accounts with the highest bal
Non-INST first lien open date for open accounts with the highest bal
Non-INST first lien monthly payment for open accounts with the highest bal
Non-INST first lien loan amortization term for open accounts with the highest bal
Non-INST first lien current bal for open accounts with the $2^{nd}$ highest bal
Non-INST first lien amount financed for open accounts with the $2^{nd}$ highest bal
Non-INST first lien open date for open accounts with the $2^{nd}$ highest bal
Non-INST first lien monthly payment for open accounts with the $2^{nd}$ highest bal
Non-INST first lien loan amortization term for open accounts with the $2^{nd}$ highest bal
Non-INST first lien current bal for open accounts with the $3^{rd}$ highest bal
Non-INST first lien amount financed for open accounts with the $3^{rd}$ highest bal
Non-INST first lien open date for open accounts with the $3^{rd}$ highest bal
Non-INST first lien monthly payment for open accounts with the $3^{rd}$ highest bal
Non-INST first lien loan amortization term for open accounts with the $3^{rd}$ highest bal
INST first lien ECOA weighted number of open accounts
INST first lien ECOA weighted sum of bal for open accounts
INST home equity loan ECOA weighted number of open accounts
INST home equity loan ECOA weighted sum of bal for open accounts
INST auto ECOA weighted number of open accounts
INST auto ECOA weighted sum of bal for open accounts
INST other installment ECOA weighted number of open accounts
INST other installment ECOA weighted sum of bal for open accounts
INST heloc ECOA weighted number of open accounts
INST heloc ECOA weighted sum of bal for open accounts
INST bankcard ECOA weighted number of open accounts
INST bankcard ECOA weighted sum of bal for open accounts
INST other loc ECOA weighted number of open accounts
INST other loc ECOA weighted sum of bal for open accounts
Non-INST non-finance first lien ECOA weighted number of open accounts
Non-INST non-finance first lien ECOA weighted sum of bal for open accounts
Non-INST non-finance home equity loan ECOA weighted number of open accounts
Non-INST non-finance home equity loan ECOA weighted sum of bal for open accounts
Non-INST non-finance auto ECOA weighted number of open accounts
Non-INST non-finance auto ECOA weighted sum of bal for open accounts
Non-INST non-finance other installment ECOA weighted number of open accounts
Non-INST non-finance other installment ECOA weighted sum of bal for open accounts
Non-INST non-finance heloc ECOA weighted number open accounts
Non-INST non-finance heloc ECOA weighted sum of bal for open accounts
Non-INST non-finance bankcard ECOA weighted number open accounts
Non-INST non-finance bankcard ECOA weighted sum of bal for open accounts
Non-INST non-finance other loc ECOA weighted number open accounts
Non-INST non-finance other loc ECOA weighted sum of bal for open accounts
Non-INST finance first lien ECOA weighted number of open accounts
Non-INST finance first lien ECOA weighted sum of bal for open accounts
Non-INST finance home equity loan ECOA weighted number of open accounts
Non-INST finance home equity loan ECOA weighted sum of bal for open accounts
Non-INST finance auto ECOA weighted number of open accounts
Non-INST finance auto ECOA weighted sum of bal for open accounts
Non-INST finance other installment ECOA weighted number of open accounts
Non-INST finance other installment ECOA weighted sum of bal for open accounts
Non-INST finance heloc ECOA weighted number of open accounts
Non-INST finance heloc ECOA weighted sum of bal for open accounts
Non-INST finance bankcard ECOA weighted number of open accounts
Non-INST finance bankcard ECOA weighted sum of bal for open accounts
Non-INST finance other loc ECOA weighted number of open accounts
Non-INST finance other loc ECOA weighted sum of bal for open accounts
installment trade lines with bal
minor derogatory items
revolving trades with bal
revolving TL 30+ ever
revolving/open TL 30+ ever
Total # of trades
trades 30+ ever & derog pub rec
Percent revolving bal
Percent revolving/open bal
Avg bal revolving TL opened last 12 mos
Avg bal rev/open TL opened last 12 mos
Average revolving bal
Months since most recent trade opened
Most since most recent inq excl 7 days
Months since oldest revolving TL opened
Net fraction bank revolving burden
Net fraction revolving/open burden
Total revolving bal
Total revolving/open bal Worst rating revolving trade lines
Worst rating TL opened last 36 m
Months since most recent derogatory public record
Months since most recent 90+ trade line rating
# of disputed accounts
Transrisk new account version 2 score
Adverse action reason codes for transrisk new account score
Transrisk new account reject tag (D, I, N, X)
Select disposition (A—passed all selection criteria, R—failed selection criteria)
Select level (for now, value will always be ACC, but can change if program changes)
Reject reason (NA2excel—failed, levelacc—passed)
Ethnicity tag (A—Asian, H—Hispanic, Blank—ethnicity of consumer name is unknown)
Gender (F—female, M—male, I—name is initials, U—unknown, A—ambiguous)
Maximum current delinquency
accounts rated 30 in the last 6 m
accounts rated 60 in the last 6 m
accounts rated 90 in the last 6 m
accounts rated 30 in the last 12 m
accounts rated 60 in the last 12 m
accounts rated 90 in the last 12 m
Months since most recent 30+ trade line delinquency
Worst trade line rating last 12 m
Total assets
Total deposits
Age of consumer based on credit data (values 18-99)
Age of consumer is actual or not (B=actual or T=calculated)
Fleet first lien number of open accounts
Fleet first lien number of open accounts opened w/in the last 3 m
Fleet first lien sum of bal for open accounts
Fleet first lien sum of bal for open accounts opened w/in 3 m
Fleet first lien number of accounts currently 90+ verified w/in the last 6 m
Fleet first lien sum of bal currently 90+ verified w/in the last 6 m
Fleet first lien sum of amount financed for open accounts
Fleet first lien sum of amount financed for open accounts open w/in 3 m
Fleet first lien age of oldest trade
Fleet home equity loan number of open accounts
Fleet home equity loan number of open accounts opened w/in the last 3 m
Fleet home equity loan sum of bal for open
Fleet home equity loan sum of bal for open accounts opened w/in 3 m
Fleet home equity loan number of accounts currently 90+ verified w/in the last 6 m
Fleet home equity loan sum of bal currently 90+ verified w/in the last 6 m
Fleet home equity loan sum of amount financed for open accounts
Fleet home equity loan sum of amount financed for open accounts open with 3 m
Fleet auto number of open accounts
Fleet auto number of open accounts opened w/in the last 3 m
Fleet auto sum of bal for open accounts
Fleet auto sum of bal for open accounts opened w/in 3 m
Fleet auto number of accounts currently 90+ verified w/in the last 6 m
Fleet auto sum of bal currently 90+ verified w/in the last 6 m
Fleet auto sum of amount financed for open accounts
Fleet auto sum of amount financed for open accounts open with 3 m
Fleet other installment number of open accounts
Fleet other installment number of open accounts opened w/in the last 3 m
Fleet other installment sum of bal for open accounts
Fleet other installment sum of bal for open accounts opened w/in 3 m
Fleet other installment number of accounts currently 90+ verified w/in the last 6 m
Fleet other installment sum of bal currently 90+ verified w/in the last 6 m
Fleet other installment sum of amount financed for open accounts
Fleet other installment sum of amount financed for open accounts open with 3 m
Fleet heloc number of open accounts
Fleet heloc number of open accounts in last 3 month
Fleet heloc sum of bal for open accounts
Fleet heloc sum of bal for open accounts opened w/in 3 m
Fleet heloc number of accounts currently 90+ verified w/in the last 6 m
Fleet heloc sum of bal currently 90+ verified w/in the last 6 m
Fleet heloc sum of credit limit for open accounts
Fleet heloc sum of credit limit for open accounts open w/in 3 m
Fleet heloc number of open accounts with a zero bal
Fleet heloc number of open accounts opened w/in the last 3 m
Fleet bankcard number of open accounts
Fleet bankcard number of open accounts opened w/in the last 3 m
Fleet bankcard sum of bal for open accounts
Fleet bankcard sum of bal for open accounts opened w/in 3 m
Fleet bankcard number of accounts currently 90+ verified w/in the last 6 m
Fleet bankcard sum of bal currently 90+ verified w/in the last 6 m
Fleet bankcard sum of credit limit for open accounts
Fleet bankcard sum of credit limit for open accounts open with 3 m
Fleet bankcard number of open accounts with a zero bal
Fleet bankcard number of open account opened w/in the last 3 month with a zero bal
Fleet bankcard age of oldest trade
Fleet bankcard age of youngest trade
Fleet bankcard highest open bal
Fleet bankcard credit limit for highest open bal
Fleet other loc number of open accounts
Fleet other loc number of open accounts opened w/in the last 3 m
Fleet other loc sum of bal for open accounts
Fleet other loc sum of bal for open accounts opened w/in 3 m
Fleet other loc number of accounts currently 90+ verified w/in the last 6 m
Fleet other loc sum of bal currently 90+ verified w/in the last 6 m
Fleet other loc sum of credit limit for open accounts
Fleet other loc sum of credit limit for open accounts open with 3 m
Fleet other loc number of open accounts with a zero bal Fleet other loc number of open accounts opened w/in the last 3 m with a zero bal
Number of fleet inquiries w/in 3 m
Fleet first lien current bal for open accounts with the highest bal
Fleet first lien amount financed for open accounts with the highest bal
Fleet first lien open date for open accounts with the highest bal
Fleet first lien monthly payment for open accounts with the highest bal
Fleet first lien loan amortization term for open accounts with the highest bal
Fleet first lien current bal for pen accounts with the $2^{nd}$ highest bal
Fleet first lien amount financed for open accounts with the $2^{nd}$ highest bal
Fleet first lien open date for open accounts with the $2^{nd}$ highest bal
Fleet first lien monthly payment for open accounts with the $2^{nd}$ highest bal
Fleet first lien loan amortization term for open accounts with the $2^{nd}$ highest bal
Fleet first lien current bal for open accounts with the $3^{rd}$ highest bal
Fleet first lien amount financed for open accounts with the $3^{rd}$ highest bal
Fleet first lien open date for open accounts with the $3^{rd}$ highest bal
Fleet first lien monthly payment for open accounts with the $3^{rd}$ highest bal
Fleet first lien loan amortization term for open accounts with the $3^{rd}$ highest bal
Fleet first lien ECOA weighted number of open accounts
Fleet first lien ECOA weighted sum of bal for open accounts
Fleet home equity loan ECOA weighted number of open accounts
Fleet home equity loan ECOA weighted sum of bal for open accounts
Fleet auto ECOA weighted number of open accounts
Fleet auto ECOA weighted sum of bal for open accounts
Fleet other installment ECOA weighted number of open accounts
Fleet other installment ECOA weighted sum of bal for open accounts
Fleet heloc ECOA weighted number of open accounts
Fleet heloc ECOA weighted sum of bal for open accounts
Fleet bankcard ECOA weighted number of open accounts
Fleet bankcard ECOA weighted sum of bal for open accounts
Fleet other loc ECOA weighted number of open accounts
Fleet other loc ECOA weighted sum of bal for open accounts
Bankcard credit limit for open account with the highest credit limit
Bankcard balance for open account with the highest credit limit
Bankcard open date for open account with the highest credit limit
Bankcard credit limit for open account with the $2^{nd}$ highest credit limit
Bankcard balance for open account with the $2^{nd}$ highest credit limit
Bankcard open date for open account with the $2^{nd}$ highest credit limit
Bankcard credit limit for open account with the $3^{rd}$ highest credit limit
Bankcard balance for open account with the $3^{rd}$ highest credit limit
Bankcard open date for open account with the $3^{rd}$ highest credit limit
Bankcard credit limit for open account with the $4^{th}$ highest credit limit
Bankcard balance for open account with the $4^{th}$ highest credit limit
Bankcard open date for open account with the $4^{th}$ highest credit limit
Bankcard credit limit for open account with the $5^{th}$ highest credit limit
Bankcard balance for open account with the $5^{th}$ highest credit limit
Bankcard open date for open account witj the $5^{th}$ highest credit limit
Bankcard credit limit for open account with the $6^{th}$ highest credit limit
Bankcard balance for open account with the $6^{th}$ highest credit limit
Bankcard open date for open account with the $6^{th}$ highest credit limit
INST bankcard indicator for top 6 bankcards by credit limit
Fleet bankcard indicator for top 6 bankcards by credit limit
Heloc credit limit for open account with the highest credit limit
Heloc balance for open account with the highest credit limit
Heloc open date for open account with the highest credit limit
Heloc credit limit for open account with the $2^{nd}$ highest credit limit
Heloc balance for open account with the $2^{nd}$ highest credit limit
Heloc open date for open account with the $2^{nd}$ highest credit limit
INST heloc indicator for top 2 helocs by credit limit
Fleet heloc indicator for top 2 helocs by credit limit
Heloan credit limit for open account with the highest credit limit
Heloan balance for open account with the highest credit limit
Heloan open date for open account with the highest credit limit
Heloan credit limit for open account with the $2^{nd}$ highest credit limit
Heloan balance for open account with the $2^{nd}$ highest credit limit
Heloan open date for open account with the $2^{nd}$ highest credit limit
INST heloan indicator for top 2 heloans by credit limit
Fleet heloan indicator for top 2 heloans by credit limit
# of months since last address change
Zip code of previous address
SSN type flag
accounts with currently bal>0
Total current bal of all accounts excluding mortgage
Number of accounts rated 30+ ever
Number of derogatory public records
Number of public record bankruptcies
# of open accounts
Total public record amounts
Total collection amounts ever owed
Latitude and longitude
Latitude and longitude flag TU income estimator
TU income estimator code
TU debt to income estimator
Opt-out flag
Empirica score reject tag
State fips code
County fips code
Census tract
MSA code
Estimated home value based on banton score model
Number of INST trades ever
Number of fleet trades ever
Peer group first lien number of open accounts
Peer group first lien number of open accounts opened w/in the last 3 m
Peer group first lien sum of bal for open accounts
Peer group first lien sum of bal for open accounts opened w/in 3 m
Peer group first lien number of accounts currently 90+ verified w/in the last 6 m
Peer group first lien sum of bal currently 90+ verified w/in the last 6 m
Peer group first lien sum of amount financed for open accounts
Peer group first lien sum of amount financed for open accounts open w/in 3 m
Peer group first lien age of oldest trade
Peer group first lien current bal for open accounts with the highest bal
Peer group first lien amount financed for open accounts with the highest bal
Peer group first lien open date for open accounts with the highest bal
Peer group first lien current bal for open accounts with the $2^{nd}$ highest bal
Peer group first lien amount financed for open accounts with the $2^{nd}$ highest bal
Peer group first lien open date for open accounts with the $2^{nd}$ highest bal
Peer group first lien ECOA weighted number of open accounts
Peer group first lien ECOA weighted sum of bal for open accounts
Number or peer group inquiries with kob of B w/in 3 m
Number of peer group inquiries with kob of F or Q w/in 3 m
Peer group bankcard indicator for top 6 bankcards by credit limit
Peer group heloc indicator for top 2 helocs by credit limit
Peer group heloan indicator for top 2 helocs by credit limit
INST first lien ECOA indicator for open accounts with the highest bal
INST first lien ECOA indicator for open accounts with the $2^{nd}$ highest bal
Non-INST first lien ECOA indicator for open accounts with the highest bal
Non-INST first lien ECOA indicator for open accounts with the $2^{nd}$ highest bal
Fleet first lien ECOA indicator for open accounts with the highest bal
Fleet first lien ECOA indicator for open accounts with the $2^{nd}$ highest bal
Peer group first lien ECOA indicator for open accounts with the highest bal
Peer group first lien ECOA indicator for open accounts with the $2^{nd}$ highest bal
Bankcard ECOA indicator for open account with the highest credit limit
Bankcard ECOA indicator for open account with the $2^{nd}$ highest credit limit
Bankcard ECOA indicator for open account with the $3^{rd}$ highest credit limit
Bankcard ECOA indicator for open account with the $4^{th}$ highest credit limit
Bankcard ECOA indicator for open account with the $5^{th}$ highest credit limit
Bankcard ECOA indicator for open account with the $6^{th}$ highest credit limit
Heloc ECOA indicator for open account with the highest credit limit
Heloc ECOA indicator for open account with the $2^{nd}$ highest credit limit
Heloan ECOA indicator for open account with the highest credit limit
Heloan ECOA indicator for open account with the $2^{nd}$ highest credit limit
Bankcard raw cl for open acc w/$1^{st}$ highest cl
Bankcard raw cl for open acc w/$2^{nd}$ highest cl
Bankcard raw cl for open acc w/$3^{rd}$ highest cl
Bankcard raw cl for open acc w/$4^{th}$ highest cl
Bankcard raw cl for open acc w/$5^{th}$ highest cl
Bankcard raw cl for open acc w/$6^{th}$ highest cl
Heloc raw cl for open acc w/$1^{st}$ highest cl
Heloc raw cl for open acc w/$2^{nd}$ highest cl
City
State
Zip first 5 digits code
INST on us flag
Type of tax identification code
INST first mortgage number of open accounts
INST first mortgage sum of balances for open accounts
INST first mortgage sum of originations for open accounts
Months on book for oldest open first mortgage account
Months on book for youngest open first mortgage account
INST home equity loan number of open accounts
INST home equity loan sum of balances for open accounts
INST home equity loan sum of originations for open accounts
Months on book for oldest open home equity loan account
Months on book for youngest open home equity loan account
INST auto number of open accounts
INST auto sum of balances for open accounts
INST auto sum of originations for open accounts
Months on book for oldest open auto account
Months on book for youngest open auto account
INST other installment number of open accounts
INST other installment sum of balances for open accounts
INST other installment sum of originations for open accounts
Months on book for oldest open other installment account
Months on book for youngest open other installment account
INST heloc number of open accounts
INST heloc sum of balances for open accounts
INST heloc sum of originations for open accounts
Months on book for oldest open heloc account
Months on book for youngest open heloc account
INST bankcard number of open accounts
INST bankcard sum of balances for open accounts
INST bankcard sum of originations for open accounts
Months on book for oldest open bankcard account
Months on book for youngest open bankcard account INST other loc number of open accounts
INST other loc sum of balances for open accounts
INST other loc sum of originations for open accounts
Months on book for oldest open other loc account
Months on book for youngest open other loc account
INST any deposit number of open accounts
INST any deposit sum of balances for open accounts
Months on book for oldest open deposit account
Months on book for youngest open deposit account
INST any investment number of open accounts
INST any investment sum of balances for open accounts
Months on book for oldest open investment account
Months on book for youngest open investment account
Bureau refresh score
INST dfs auto number of open accounts
INST dfs auto sum of balances for open accounts
INST dfs speciality number of open accounts
INST dfs speciality sum of balances for open accounts
INST heloc number of increase accounts in last 3 month
INST heloc sum of balances for increase accounts in last 3 months
INST heloc sum of line amount for increase accounts in last 3 months
INST heloc sum of incremental line amount for increase accounts in last 3 months
INST secured bankcard number of open accounts
INST secured bankcard sum of balances for open accounts
INST secured bankcard sum of line amount for open accounts
INST checking number of open accounts
INST checking sum of balances for open accounts
INST CD number of open accounts
INST CD sum of balances for open accounts
INST IRA number of open accounts
INST IRA sum of balances for open accounts
INST money market number of open accounts
INST money market sum of balances for open accounts
INST regular savings number of open accounts
INST regular savings sum of balances for open accounts
INST annuity number of open accounts
INST annuity sum of balances for open accounts
INST brokerage number of open accounts
INST brokerage sum of balances for open accounts
INST money manager number of open accounts
INST money manager sum of balances for open accounts
INST number of ATM/check cards
INST first mortgage nibt amount for open accounts
INST home equity loan nibt amount for open accounts
INST auto nibt amount for open accounts
INST other installment nibt amount for open accounts
INST heloc nibt amount for open accounts
INST bankcard nibt amount for open accounts
INST other loc nibt amount for open accounts
INST any deposit nibt amount for open accounts
INST any investment nibt amount for open accounts
Insufficient funds fees amount
Overdraft charge amount
Fully allocated net income amount
Net interest income amount
Non interest income amount
Non interest expense amount
# of months party has had a bac relationship
Name form code
Service level indicator code
Sales and service sales channel code
Plus code
Number of premier sales channel accounts
Number of private bank sales channel accounts
Number of small business sales channel accounts
Associate indicator
Customer age
Gender
Seg_cd when seg_typ_cd=pprf
Seg_cd when seg_typ_cd=nedatt
Seg_cd when seg_typ_cd=ciggrp
Seg_cd when seg_typ_cd=potndep
Seg_cd when seg_typ_cd=potnin
Seg_cd when seg_typ_cd=potninv
Seg_cd when seg_typ_cd=potntotbl
Seg_cd when seg_typ_cd=valuquad
Realized profit amount
Realized profit deposit amount
Realized profit investment amount
Realized profit loan amount
Unrealized total balance amount
Unrealized deposit amount
Unrealized investment amount
Unrealized loan amount
Unrealized profit amount
Unrealized profit deposit amount
Unrealized profit investment amount
Unrealized profit loan amount
Ethnicity code
Ethnicity code
Market segment code
Party collection child indicator
Party collection demographic cluster code
Party collection demographic cluster group code
Home purchase amount
Home market value amount
Available home equity amount
Loan to value percent
Home owner indicator
Home owner rent code
Number of service calls to the vru system
Number of times logged in to online banking/billpay
Premier migration quarters on book
Loan purpose
Loan channel
Application date
Amount requested
Score
Custom score
Actual ltv
Actual dti
Final application status
Interest rate
Days to fund
Line increase flag
Allowable ltv
Allowable dti
INST lien position
Total lien amount
Prequal flag
Application date
Amount requested
Score
Custom score
Actual ltv
Actual dti
Final application status
Interest rate
Days to fund
Number of applicants Escrow deposit at closing
Property zip code
Loan purpose
On us refinance transaction indicator
Property sales price
Total ltv
Incomplete application decline
Asset related decline
Bankruptcy related decline
Credit report delinquency decline
Employment related decline
Income related decline
Insufficient credit reference decline
Other decline
Derogatory public record decline
Property related decline
Score decline
Credit card channel
Mtg product
Home equity product
INST bankcard co-brand number of open accounts
INST bankcard co-brand sum of balances for open accounts
INST agent/affinity number of open accounts
INST bankcard agent/affinity sum of balances for open accounts
Total teller deposit quantity
Total teller withdrawal quantity
Total ATM deposit quantity
Total ATM withdrawal quantity
Max teller deposit quantity
Max teller withdrawal quantity
Max service calls to the vru system
Max times logged in to online banking/billpay
Max ATM deposit quantity
Max ATM withdrawal quantity
He loan channel
Fbf on us flag
Heloc increase flag
Heloc increase months on book
Heloc increase incremental line amount
Value Added Attributes
Weighted INST auto sum of bal for open accounts
Weighted INST auto sum of bal currently 90+ verified w/in the last 6 m
Weighted INST auto sum of amount financed for open accounts
Weighted INST auto number of open accounts
Weighted INST auto number of accounts currently 90+ verified w/in the last 6 m
Weighted non-INST finance auto sum of
Weighted non-INST finance auto sum of bal currently 90+ verified w/in 6 m
Weighted non-INST finance auto sum of amount financed for open accounts
Weighted non-INST finance auto number of open accounts
Weighted non-INST finance auto number of accounts currently 90+ verified w/in 6 m
Weighted fleet auto sum of bal for open accounts
Weighted fleet auto sum of bal currently 90+ verified w/in last 6 m
Weighted fleet auto sum of amount financed for open accounts
Weighted fleet auto number of open accounts
Weighted fleet auto number of accounts currently 90+ verified w/in the last 6 m
Weighted non-INST non-finance auto sum of bal for open accounts
Weighted non-INST non-finance auto sum of bal currently 90+ verified w/in 6 m
Weighted non-INST non-finance auto sum of amount financed for open accounts
Weighted non-INST non-finance auto number of open accounts
Weighted non-INST non-finance auto number of
Weighted non-INST total auto sum of
Weighted non-INST total auto sum of bal currently 90+ verified w/in 6 m
Weighted non-INST total auto sum of amount financed for open accounts
Weighted non-INST total auto number of open accounts
Weighted non-INST total auto number of accounts currently 90+ verified w/in 6 m
Weighted INST credit card sum of bal for open accounts
Weighted INST credit card sum of bal currently 90+ verified w/in the last 6 m
Weighted INST credit card sum of credit limit for open accounts
Weighted INST credit card number of open accounts
Weighted INST credit card number of accounts currently 90+ verified w/in the last 6 m
Weighted INST credit card number of open accounts with a zero bal
Weighted non-INST finance credit card sum of bal for open accounts
Weighted non-INST finance credit card sum of bal currently 90+ verified w/in 6 m
Weighted non-INST finance credit card sum of credit limit for open accounts
Weighted non-INST finance credit card number of open accounts
Weighted non-INST finance credit card number of accounts currently 90+ verified w/in 6 m
Weighted non-INST finance credit card number of open accounts with a zero bal
Weighted fleet credit card sum of bal for open accounts
Weighted fleet credit card sum of bal currently 90+ verified w/in the last 6 m
Weighted fleet credit card sum of credit limit for open accounts
Weighted fleet credit card number of open accounts
Weighted fleet credit card number of accounts currently 90+ verified w/in the last 6 m
Weighted fleet credit card number of open accounts with a zero balance
Weighted non-INST non-finance credit card sum of bal for open accounts
Weighted non-INST non-finance credit card sum of
Weighted non-INST non-finance credit card sum of credit limit for open accounts
Weighted non-INST non-finance credit card number of open accounts
Weighted non-INST non-finance credit card number of accounts currently 90+ verified w/in 6 m
Weighted non-INST non-finance credit card number of open accounts with a zero bal
Weighted non-INST total credit card sum of bal for open accounts
Weighted non-INST total credit card sum of bal currently 90+ verified w/in 6 m
Weighted non-INST total credit car sum of credit limit for open accounts Weighted non-INST total credit card number of open accounts Weighted non-INST total credit card number of accounts currently 90+ verified w/in 6 m Weighted non-INST total credit card number of open accounts with a zero bal Weighted INST heloc sum of bal for open accounts Weighted INST heloc sum of bal currently 90+ verified w/in the last 6 m Weighted INST heloc sum of credit limit for open accounts Weighted INST heloc number of open accounts Weighted INST heloc number of accounts currently 90+ verified w/in the last 6 m Weighted INST heloc number of open accounts with a zero bal Weighted non-INST finance heloc sum of bal for open accounts Weighted non-INST finance heloc sum of bal currently 90+ verified w/in 6 m Weighted non-INST finance heloc sum of credit limit for open accounts Weighted non-INST finance heloc number of open accounts Weighted non-INST finance heloc number of accounts currently 90+ verified w/in 6 m Weighted non-INST finance heloc number open accounts with a zero bal Weighted fleet heloc sum of bal for open accounts Weighted fleet heloc sum of bal currently 90+ verified w/in the last 6 m Weighted fleet heloc sum of credit limit for open accounts Weighted fleet heloc number of open accounts Weighted fleet heloc number of accounts currently 90+ verified w/in the last 6 m Weighted fleet heloc number of open accounts with a zero bal Weighted non-INST non-finance heloc sum of bal for open accounts Weighted non-INST non-finance heloc sum of bal currently 90+ verified w/in 6 m Weighted non-INST non-finance heloc sum of credit limit for open accounts Weighted non-INST non-finance heloc number of open accounts Weighted non-INST non-finance heloc number of accounts currently 90+ verified w/in 6 m Weighted non-INST non-finance heloc number of open accounts with a zero bal Weighted non-INST total heloc sum of bal for open accounts Weighted non-INST total heloc sum of bal currently 90+ verified w/in 6 m Weighted non-INST total heloc sum of credit limit for open accounts Weighted non-INST total heloc number of open accounts Weighted non-INST total heloc number of accounts currently 90+ verified w/in 6 m Weighted non-INST total heloc number of open accounts with a zero bal Weighted INST home equity loan sum of bal for open Weighted INST home equity loan sum of bal currently 90+ verified w/in the last 6 m Weighted INST home equity loan sum of amount financed for open accounts Weighted INST home equity loan number of open accounts Weighted INST home equity loan number of accounts currently 90+ verified w/in the last 6 m Weighted non-INST finance home equity loan sum of bal for open accounts Weighted non-INST finance home equity loan sum of bal currently 90+ verified w/in 6 m Weighted non-INST finance home equity loan sum of amount financed for open accounts Weighted non-INST finance home equity loan number of open accounts Weighted non-INST finance home equity loan number of accounts currently 90+ verified w/in 6 m Weighted fleet home equity loan sum of bal for open Weighted fleet home equity loan sum of bal currently 90+ verified w/in the last 6 m Weighted fleet home equity loan sum of amount financed for open accounts Weighted fleet home equity loan number of open accounts Weighted fleet home equity loan number of accounts currently 90+ verified w/in the last 6 m Weighted non-INST non-finance home equity loan sum of bal for open accounts Weighted non-INST non-finance home equity loan sum of bal currently 90+ verified w/in 6 m Weighted non-INST non-finance home equity loan sum of amount financed for open accounts Weighted non-INST non-finance home equity loan number of open accounts Weighted non-INST non-finance home equity loan number of accounts currently 90+ verified w/in 6 m Weighted non-INST total home equity loan sum of bal for open accounts Weighted non-INST total home equity loan sum of bal currently 90+ verified w/in 6 m Weighted non-INST total home equity loan sum of amount financed for open accounts Weighted non-INST total home equity loan number of open accounts Weighted non-INST total home equity loan number of accounts currently 90+ verified w/in 6 m Weighted INST other installment sum of bal for open accounts Weighted INST other installment sum of bal currently 90+ verified w/in the last 6 m Weighted INST other installment sum of amount financed for open accounts Weighted INST other installment number of open accounts Weighted INST other installment number of accounts currently 90+ verified w/in the last 6 m Weighted non-INST finance other installment sum of bal for open accounts Weighted Non-INST finance other installment sum of bal currently 90+ verified w/in 6 m Weighted non-INST finance other installment sum of amount financed for open accounts Weighted non-INST finance other installment number of open accounts Weighted non-INST finance other installment number of accounts currently 90+ verified w/in 6 month Weighted Fleet other installment sum of bal for open accounts Weighted fleet other installment sum of bal currently 90+ verified w/in the last 6 m Weighted fleet other installment sum of amount financed for open accounts Weighted fleet other installment number of open accounts Weighted fleet other installment number of accounts currently 90+ verified w/in the last 6 m Weighted non-INST non-finance other installment sum of bal for open accounts Weighted non-INST non-finance other installment sum of bal currently 90+ verified w/in 6 m Weighted non-INST non-finance other installment sum of amount financed for open accounts Weighted non-INST non-finance other installment number of open accounts Weighted non-INST non-finance other installment number of accounts currently 90+ verified w/in 6 m Weighted non-INST total other installment sum of bal for open accounts Weighted non-INST total other installment sum of bal currently 90+ verified w/in 6 m Weighted non-INST total other installment sum of amount financed for open accounts Weighted non-INST total other installment number of open accounts Weighted non-INST total other installment number of accounts currently 90+ verified w/in 6 month Weighted INST other loc sum of bal for open accounts Weighted INST other loc sum of bal currently 90+ verified w/in the last 6 m Weighted INST other loc sum of credit limit for open accounts Weighted INST other loc number of open accounts Weighted INST other loc number of accounts currently 90+ verified w/in the last 6 m Weighted INST other loc number of open accounts with a zero bal Weighted non-INST finance other loc sum of bal for open accounts Weighted non-INST finance other loc sum of bal currently 90+ verified w/in 6 m Weighted non-INST finance other loc sum of credit limit for open accounts Weighted non-INST finance other loc number of open accounts Weighted non-Inst finance other loc number of accounts currently 90+ verified w/in 6 m Weighted non-INST finance other loc number of open accounts with a zero bal Weighted fleet other loc sum of bal for open accounts Weighted fleet other loc sum of bal currently 90+ verified w/in the last 6 m Weighted fleet other loc sum of credit limit for open accounts Weighted fleet other loc number of open accounts Weighted fleet other loc number of accounts currently 90+ verified w/in the last 6 m Weighted fleet other loc number of open accounts with a zero bal Weighted non-INST non-finance other loc sum of bal for open accounts Weighted non-INST non-finance other loc sum of bal currently 90+ verified w/in 6 m Weighted non-INST non-finance other loc sum of credit limit for open accounts Weighted non-INST non-finance other loc number of open accounts Weighted non-INST non-finance other loc number of accounts currently 90+ verified w/in 6 m Weighted non-INST non-finance other loc number of open accounts with a zero bal Weighted non-INST total other loc sum of bal for open accounts Weighted non-INST total other loc sum of bal currently 90+ verified w/in 6 m Weighted non-INST total other loc sum of credit limit for open accounts Weighted non-INST total other loc number of open accounts Weighted non-INST total other loc number of accounts currently 90+ verified w/in 6 m Weighted non-INST total other loc number of open accounts with a zero bal Weighted INST first lien sum of bal for open accounts Weighted INST first lien sum of bal currently 90+ verified w/in the last 6 m Weighted INST first lien sum of amount financed for open accounts Weighted INST first lien number of open accounts Weighted INST first lien number of accounts currently 90+ verified w/in the last 6 m Weighted non-INST finance first lien sum of bal for open accounts Weighted non-INST finance first lien sum of bal currently 90+ verified w/in 6 m Weighted non-INST finance first lien sum of amount financed for open accounts Weighted non-INST finance first lien number of open accounts Weighted non-INST finance first lien number of accounts currently 90+ verified w/in 6 m Weighted fleet first lien sum of bal for open accounts Weighted fleet first lien sum of bal currently 90+ verified w/in the last 6 m Weighted fleet first lien sum of amount financed for open accounts Weighted fleet first lien number of open accounts Weighted fleet first lien number of accounts currently 90+ verified w/in the last 6 m Weighted non-INST non-finance first lien sum of bal for open accounts Weighted non-INST non-finance first lien sum of bal currently 90+ verified w/in 6 m Weighted non-INST non-finance first lien sum of amount financed for open accounts Weighted non-INST non-finance first lien number of open accounts Weighted non-INST non-finance first lien number of accounts currently 90+ verified w/in 6 m Weighted non-INST total first lien sum of bal for open accounts Weighted non-INST total first lien sum of bal currently 90+ verified w/in 6 m Weighted non-INST total first lien sum of amount financed for open accounts Weighted non-INST total first lien number of open accounts Weighted non-INST total first lien number of accounts currently 90+ verified w/in 6 m Weighted INST dfs auto number of open accounts Weighted INST dfs auto sum of bal for open accounts Weighted INST secured credit card number of open accounts Weighted INST secured credit car sum of bal for open accounts Weighted INST heloc number of increase accounts in last 3 month Weighted INST heloc sum of balances for increase accounts in last 3 months Weighted INST heloc sum of line of amount for increase accounts in last 3 months
Weighted INST heloc sum of incremental line amount for increase accounts in last 3 months
INST credit customer flag
Non-INST credit customer flag
Duplicate record flag
Census tract calculated flag
Market
Market segment
Estimated FICO
Footprint Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

What is claimed is:

1. A system for creating a credit market database for a first institution, wherein the system populates the credit market database with information about customers and consumers, wherein customers are individuals that have an existing relationship with the first institution and consumers are individuals that have an existing relationship with a second institution, the system comprising:
 a communication device;
 a memory device in communication with the communication device and comprising customer attribute data stored therein, wherein the customer attribute data comprises a plurality of customer entries, each entry of the plurality of customer entries represents a customer and includes at least one customer-relationship attribute; and
 a processing device in communication with the communication device and the memory device, wherein the processing device is configured to:
  use the communication device to:
   receive the at least one customer-relationship attribute, wherein the customer-relationship attribute is selected by the first institution and defines an aspect of the relationship between the first institution and its customers;
   receive a plurality of customer values, each corresponding to one or more of the first institution's customers, each customer value representing at least one customer-relationship attribute of each customer;
   receive criteria that define a consumer type, wherein the first institution selects the criteria;
   request a list of consumers based on the criteria, wherein each of the listed consumers matches the consumer type and wherein each of the listed consumers is an individual that has a relationship with the second institution;
   receive the list of consumers as well as information about each of the listed consumers;
   receive a consumer-relationship attribute that defines at least one aspect of the relationship between the listed consumers and the second institution, wherein the first institution selects the consumer-relationship attribute so that the system will populate the credit market database with information about the aspect of the relationship between the listed consumers and the second institution that is of interest to the first institution; and
   receive a plurality of consumer values, each corresponding to one or more of the listed consumers, each consumer value representing at least one consumer-relationship attribute of each listed consumer; and
  the processing device further configured to:
   determine a value of a value-added attribute corresponding to the customer-relationship attribute, wherein the value-added attribute corresponding to the customer-relationship attribute represents the total value of the customer-relationship attribute across all of the first institution's customers, the determining comprising:
    determining a weighted value at least in part by adjusting the customer values based on one or more scaling factors thereby creating weighted customer values, and
    summing one or more of the weighted customer values;
   determine a value of a value-added attribute corresponding to the consumer-relationship attribute, wherein the value-added attribute represents the total value of the consumer-relationship attribute across all of the listed consumers, the determining comprising:
    determining a weighted value at least in part by adjusting the consumer values based on one or more scaling factors thereby creating weighted consumer values, and
    summing one or more of the weighted consumer values;
   develop the credit market database by:
    for each individual that is a customer but not a consumer, populate the credit market database with the value that represents the individual's customer-relationship attribute and the value that represents the value-added attribute corresponding to the customer-relationship attribute;
    for each individual that is a consumer but not a customer, populate the credit market database with the value that represents the individual's consumer-relationship attribute and the value that represents the value-added attribute corresponding to the consumer-relationship attribute; and
    for each individual that is both a consumer and a customer, populate the credit market database with the value that represents the individual's customer-relationship attribute, the value that represents individual's consumer-relationship attribute, the value that represents the value-added attribute corresponding to the customer-relationship attribute, and the value that represents the value-added attribute corresponding to the consumer-relationship attribute.

2. The system of claim 1, wherein the list of consumers includes individuals that have relationships with all institutions in a relevant market.

3. The system of claim 1, wherein the list of consumers that match the consumer type as well as the information about each listed consumer are received from a credit bureau.

4. The system of claim 1, wherein the criteria define a random sample of all consumers known to the credit bureau.

5. The system of claim 1, wherein the value that represents a customer's customer-relationship attribute is determined based on information stored in a customer-data file, which is maintained by the first institution.

6. The system of claim 1, wherein one or more of the scaling factors comprises a scaling-up factor representative of a portion of the entire market.

7. The system of claim 6, wherein the scaling-up factor is representative of an entire consumer market.

8. The system of claim 1, wherein one or more of the scaling factors comprises a scaling-down factor.

9. The system of claim 8, wherein the scaling-down factor is configured to account for duplicative data.

10. The system of claim 8, wherein one or more of the scaling factors comprises a scaling-up factor.

11. The system of claim 10, wherein one of the scaling factors comprises both a scaling-down factor and a scaling-up factor.

12. The system of claim 1, wherein, during determining a value of a value-added attribute corresponding to the customer-relationship attribute, the processing device is further configured to:
 divide the weighted and summed customer values in order to determine an average weighted customer value and thereby the value of the value-added attribute corresponding to the customer-relationship attribute.

13. The system of claim 1, wherein, during determining a value of a value-added attribute corresponding to the consumer-relationship attribute, the processing device is further configured to:
 divide the weighted and summed consumer values in order to determine an average weighted consumer value and thereby the value of the value-added attribute corresponding to the consumer-relationship attribute.

14. The system of claim 1, wherein, during determining a value of a value-added attribute corresponding to the customer-relationship attribute, the processing device is further configured to:
 divide the weighted and summed customer values in order to determine an average weighted customer value and thereby the value of the value-added attribute corresponding to the customer-relationship attribute; and
 wherein, during determining a value of a value-added attribute corresponding to the consumer-relationship attribute, the processing device is further configured to:
 divide the weighted and summed consumer values in order to determine an average weighted consumer value and thereby the value of the value-added attribute corresponding to the consumer-relationship attribute.

15. The system of claim 1, wherein the system is further configured to analyze the credit market database, wherein the processing device is further configured to:
 compare the value for the customer-relationship attribute with the value for the value-added attribute corresponding to the customer-relationship attribute in order to demonstrate a relationship between the customer's behavior versus the total market behavior, thereby providing information useful for future product marketing.

16. The system of claim 1, wherein the system is further configured to analyze the credit market database, wherein the processing device is further configured to:
 compare the value for the consumer-relationship attribute with the value for the value-added attribute corresponding to the consumer-relationship attribute in order to demonstrate a relationship between the consumer's behavior versus the total market behavior, thereby providing information useful for future product marketing.

17. The system of claim 1, wherein the system is further configured to analyze the credit market database, wherein the processing device is further configured to:
 compare the value for the customer-relationship attribute with the value for the value-added attribute corresponding to the customer-relationship attribute in order to demonstrate a relationship between the customer's behavior versus the total market behavior;
 compare the value for the consumer-relationship attribute with the value for the value-added attribute corresponding to the consumer-relationship attribute in order to demonstrate a relationship between the consumer's behavior versus the total market behavior; and
 compare the customer's behavior versus the total market behavior and the consumer's behavior versus the total market behavior, thereby providing information useful for future product marketing.

* * * * *

UNITED STATES PATENT AND TRADEMARK OFFICE
CERTIFICATE OF CORRECTION

| | | |
|---|---|---|
| PATENT NO. | : 8,271,364 B2 | Page 1 of 1 |
| APPLICATION NO. | : 11/160117 | |
| DATED | : September 18, 2012 | |
| INVENTOR(S) | : William A. Nobili et al. | |

It is certified that error appears in the above-identified patent and that said Letters Patent is hereby corrected as shown below:

Column 36, Claim 4, Line 62:

The claim dependency of Claim 4 should read as Claim 3.

change "The system of claim 1" to read as follows:

-- The system of claim 3 --

Signed and Sealed this
Eighteenth Day of December, 2012

David J. Kappos
*Director of the United States Patent and Trademark Office*